United States Patent

Chan et al.

Patent Number: 6,091,879
Date of Patent: Jul. 18, 2000

[54] ORGANIC PHOTOCHROMIC COMPOSITIONS AND METHOD FOR FABRICATION OF POLYMER WAVEGUIDES

[75] Inventors: Kwok Pong Chan, Troy; Brian L. Lawrence, Watervliet, both of N.Y.

[73] Assignee: Molecular OptoElectronics Corporation, Watervliet, N.Y.

[21] Appl. No.: 09/153,735

[22] Filed: Sep. 15, 1998

[51] Int. Cl.[7] .................................................. G02B 6/00
[52] U.S. Cl. ........................ 385/143; 385/141; 385/142; 385/144; 385/145
[58] Field of Search .............................. 385/143, 14, 129, 385/130, 131, 132, 8, 9, 10, 11, 141–145

[56] References Cited

U.S. PATENT DOCUMENTS

| | | | |
|---|---|---|---|
| 4,722,583 | 2/1988 | Stewart | 350/96.15 |
| 4,842,358 | 6/1989 | Hall | 350/96.15 |
| 4,895,422 | 1/1990 | Rand et al. | 350/96.15 |
| 5,007,695 | 4/1991 | Chang | 350/96.14 |
| 5,064,265 | 11/1991 | Khanarian et al. | 385/130 |
| 5,067,788 | 11/1991 | Jannson et al. | 385/2 |
| 5,142,605 | 8/1992 | Diemeer et al. | 385/130 |
| 5,265,178 | 11/1993 | Braun et al. | 385/24 |
| 5,396,362 | 3/1995 | Yakymyshyn et al. | 359/245 |
| 5,541,039 | 7/1996 | McFarland et al. | 430/290 |
| 5,892,857 | 4/1999 | McCallion | 385/14 X |

OTHER PUBLICATIONS

P. Boldt et al., "Guanidyl and Phosphoraniminyl Substituents: New Electron Donors in Second–Order Nonlinear Optical Chromophores", *Adv. Mater.* 8, 672–675 (1996).

P. Boldt et al., "Tricyanoquinodimethane Derivatives with Extremely Large Second–Order Optical Nonlinearities", *Chem. Commun.*, 793–795 (1996).

B. P. Bespalov et al., "Chemistry of Quinomethides—II. Reaction of 7,7,8,8,–Tetracyanoquinodimethide with Aromatic Amines", *J. Org. Chem. USSR* (Engl. Transl.) 10, 1072–1077 (1974).

K. McCallion et al., "Tunable In–Line Fiber–Optic Bandpass Filter", *Opt. Lett.* 19, 542–544 (1994).

W. Johnstone et al., "Fibre Optic Wavelength Channel Selector with High Resolution", *Electron. Lett.* 28, 1364–1365 (1992).

W. Johnstone et al., "Fibre Optic Modulators Using Active Multimode Waveguide Overlays", *Electron. Lett.* 27, 894–896 (1991).

G. Fawcett et al., "In–line Fibre–Optic Intensity Modulator Using Electro–Optic Polymer", *Electron. Lett.* 28, 985–986 (1992).

S. Creaney et al., "Continuous–Fiber Modulator with High–Bandwidth Coplanar Strip Electrodes", *IEEE Photonics Technol. Lett.* 8, 355–357 (1996).

M. B. J. Diemeer et al., "Photoinduced Channel Waveguide Formation in Nonlinear Optical Polymers", *Electron. Lett.* 26, 379–380 (1990).

(List continued on next page.)

*Primary Examiner*—Phan T. H. Palmer
*Attorney, Agent, or Firm*—Heslin & Rothenberg, P.C.; Martha L. Boden, Esq.

[57] ABSTRACT

Optical waveguides prepared by irradiating selected regions of positive photochromic polymeric materials with actinic radiation are disclosed. The photochromic materials undergo an irreversible photochemical change which results in an increase in the refractive index of light-exposed regions. In addition, the materials exhibit negligible second-order polarizability prior to exposure and excellent nonlinear optical properties after exposure and polarization. Thus, the exposed regions are particularly useful as the core in active waveguides for use in second-order nonlinear optical applications, as well as the core in passive waveguides. In addition, a simple two step process is disclosed for forming optical waveguides from the positive photochromic polymers. Optical structures, such as optical integrated circuits, and optical devices which incorporate the waveguides are also disclosed. The optical devices may be used as optical modulators, filters, attenuators, amplifiers, frequency converters, and electric field sensors, as well as in other nonlinear optical applications.

30 Claims, 2 Drawing Sheets

OTHER PUBLICATIONS

K. W. Beeson et al., "Photochemical Laser Writing of Polymeric Optical Waveguides", *Appl. Phys. Lett.* 58, 1955–1957 (1991).

G. J. Smets and S. Matsumoto, "Influence of Rigid Polymer Matrices on the Reversible Photochemical Reaction of α–ρ–Dimethylaminopenyl–N–m–Nitrophenynitrone", *J. Polym. Sci.: Polym. Chem. Ed.* 14, 2983–2994 (1976).

I. A. McCulloch, "Novel Photoactive Nonlinear Optical Polymers for Use in Optical Waveguides", *Macromolecules* 27, 1697–1702 (1994).

J. S. Splitter and M. Calvin, "The Photochemical Behavior of Some –oNitrostilbenes", *J. Org. Chem.* 20, 1086–1113, 1115 (1955).

P. Boldt et al., "Tricyanoquinodimethane–Derived Chromophores for Second–Order Nonlinear Optical Polymers", *SPIE* 2852, 2–11 (1996).

ORGANIC PHOTOCHROMIC COMPOSITIONS AND METHOD FOR FABRICATION OF POLYMER WAVEGUIDES

FIELD OF THE INVENTION

The present invention relates to photochromic polymer compositions, and more particularly to optical waveguides, waveguide systems, and a process for fabricating optical waveguides from photochromic polymer solutions.

BACKGROUND OF THE INVENTION

In the rapidly expanding fields of photonics and optoelectronics, optical channel waveguides are becoming increasingly important for on-chip, chip-to-chip, and board-to-board interconnections. Optical waveguides are systems or materials designed to direct and/or process light and may be characterized as either passive or active.

A passive optical waveguide is a physical structure which is capable of transmitting light while at the same time confining it to a particular region in space. In a passive waveguide, this confinement may be achieved by altering the refractive index within the region of the waveguide, the core, so that it is higher than that of the surrounding material, the cladding. Light will tend to propagate within the region of higher refractive index and so can be moved from a starting point to an ending point along a path which is defined by the waveguide region.

In an active optical waveguide, the light is not simply passively transported from one point to another, but is also processed while traveling within the guide. More particularly, these waveguides have nonlinear optical properties which are capable of changing the nature of the light (i.e. phase, amplitude, or frequency) as the light passes through the waveguide. By altering the properties of the light within a waveguide or a waveguide region, it is possible to encode and decode information and to route it as desired.

Organic polymeric materials offer important advantages for making both active and passive waveguides because they are thermally stable at high temperatures and may be readily processed and chemically modified to obtain the appropriate linear and nonlinear optical properties necessary to transmit and control light. In addition, photochromic organic polymers are of particular interest because of their ability to change refractive index upon irradiation with light at a wavelength within their respective absorption bands.

Conventional polymeric photochromic compositions include stilbene- and diazobenzene-type dye compounds, which have strong electron donors and acceptors, as described in U.S. Pat. No. 5,142,605 to Diemeer et al. and U.S. Pat. No. 5,541,039 to Mcfarland et al. These dyes are characterized by their intense absorptions in the visible region and second-order polarizability, making the materials containing them suitable for active waveguides. When the materials are irradiated at a wavelength within their corresponding absorption bands, the dyes undergo conformational isomerization. This causes the absorption band to shift to shorter wavelengths and is accompanied by a decrease in intensity. Consequently, a decrease in refractive index of the polymeric material is observed. These photochromic compositions are characterized as "negative systems" due to the decrease in refractive index that occurs upon exposure to light.

The aforementioned change in refractive index can serve as a mechanism for patterning optical waveguides. By exposing some region of the photochromic polymeric film to sufficient intensity within the absorption band, the refractive index of the exposed region is reduced. By not exposing a narrow stripe, 1 to 2 $\mu$m for example, a higher index can be maintained in the unexposed area, creating a waveguide, wherein the unexposed area serves as the waveguide core. Unfortunately, though, over time, as light propagates through the core, the same irradiation process (often referred to as "photobleachinig") that created the waveguide structure in the first place can eventually cause the refractive index of the core to decrease, and the waveguide is "bleached" away.

Another disadvantage with waveguides formed from conventional negative photochromic compositions is that the waveguides tend to be unstable over time. In particular, the photochemical isomerization mechanism discussed above is reversible, and the exposed material will slowly revert to its original state. Thus, the refractive index of the exposed region will return to its original higher value, and the usefulness of the material as an optical waveguide will terminate.

For example, Diemeer et al. reported in *Electron. Lett.* 26, 379 (1990) the use of a polymer containing a dimethylamino nitrostilbene (DANS) electro-optical side chain to fabricate a waveguide. By selective photobleachinig of the DANS chromophore at 431 nm, the transform of the DANS was converted to the cis form, thereby reducing the refractive index of the exposed polymer. However, this reaction is thermally reversible, and cis-DANS will slowly transform back to the trans form resulting in the loss of optical waveguiding properties.

Likewise, Beeson et al. reported in *Appl. Phys. Lett.* 58, 1955 (1991) a system based on the photobleaching of a nitrone compound, 4-N,N-dimethylaminophenyl)-N-phenyl nitrone (DMAPN), at 361 nm. Upon irradiation, the nitrone rearranges to an oxaziridine, and the absorption maximum shifts to 274 nm, resulting in a decrease in refractive index. However, as discussed by Smets et. al. in *J. Polym. Sci. Polym. Chem. Ed.* 14, 2983 (1976), the nitrone system is very unstable, and the oxaziridine readily reverts back to the nitrone in the absence of light.

More recently, a system based on the photobleaching of o-nitrostilbene at 488 nm was reported by I. A. McCulloch in *Macromnolecule* 27, 1697 (1994). Upon irradiation, the refractive index of the material decreases due to transformation of the dye to isatogen. This system was found to be 100 times more photosensitive than the DANS system. However, based on a study of the photoreaction by Spitter et al., at *J. Org. Chem.* 20, 1086 (1955), the exposed region was found to slowly regain its original refractive index resulting in waveguide instability.

As is apparent from the prior art, the photobleaching process is not entirely controllable, and waveguides prepared using this method deteriorate over time. This is a result of either relaxation of the conformational change back to the original state, or continued bleaching of the core region through normal use. Thus, designers have recently turned to alternative methods to create waveguides which have included embossing and reactive ion etching (RIE). However, such processes are complex and difficult to perform.

Based on the aforementioned problems associated with known techniques for creating optical waveguides, there is an apparent need for the development of more stable photochromic waveguide structures that can be formed using simple photolithographic methods. In particular, a need exists for the identification of "positive" photochromic compositions, wherein the refractive index of the light-exposed region increases. Waveguide systems formed from such positive photochromic compositions would avoid the "bleaching" problem making them more stable over time. In addition, a need exists for positive photochromic compositions that undergo an irreversible photochemical change, thereby eliminating the problems associated with light-initiated isomerization. Replacing traditional procedures for forming polymeric waveguides which require multi-step processes involving photolithography followed by plasma etching, wet chemical etching, or thermal heating with a simpler process is also highly desirable.

Moreover, there is a need for photochromic compositions for use in waveguide systems wherein the materials produced during irradiation have improved second-order nonlinear optical (NLO) properties. Larger NLO effects translate into lower power requirements and higher performance in active waveguides. Such organic photochromic compositions should exhibit negligible second-order polarizability before irradiation and large second-order polarizability after exposure.

SUMMARY OF THE INVENTION

The present invention meets the aforementioned needs and is based on the unexpected discovery that organic polymers appended or doped with moieties or compounds derived from tetracyano compounds, such as tetracyanoquinodimethane (TCNQ)/aniline and its analogues, have utility in the creation of optical waveguide structures and devices. Due to the bathochromic shift that occurs during the photochemical reaction of TCNQ/aniline and its analogues to form tetracyanoquinodimethane (TCQ)-containing chromophore, the refractive index of these compounds increases upon irradiation. The photochemical reaction for TCNQ/aniline is depicted as:

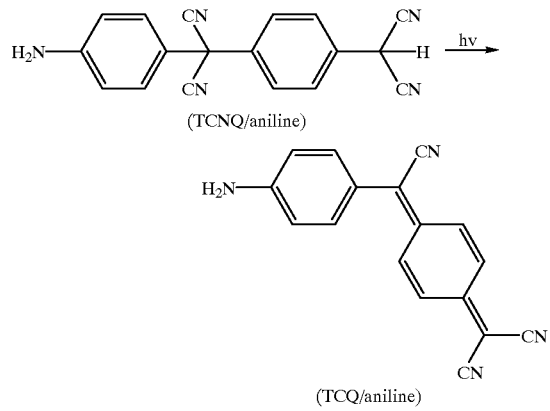

The present invention is founded on the discovery that polymeric compositions containing these and similar compounds or moieties make excellent positive photochromic materials for use in the fabrication of optical waveguides. In addition, because the photochemical reaction that occurs upon irradiation is an irreversible chemical process, waveguides fabricated from these materials do not suffer from the same type of instability problems apparent in conventional negative photochromic compositions. Also, because polymers containing TCQ-like components exhibit excellent second-order nonlinear optical properties after poling, they are particularly useful as the core in active waveguides.

The present invention is also directed to the formulation of novel photochromic polymeric materials containing,r alternative organic chromophores. Such materials exhibit negligible second-order polarizability prior to exposure to actinic radiation and excellent nonlinear optical properties after exposure and polarization. The present invention also addresses the need for a simple method for preparing high performance optical waveguide systems from the photochromic compositions identified herein.

Accordingly, in one aspect, the present invention is a positive photochromic material comprising a photoactive component and an aliphatic or aromatic polymer. The photoactive component is selected from the group of photoactive compounds or photoactive moieties having formulas (I), (II), or (III)

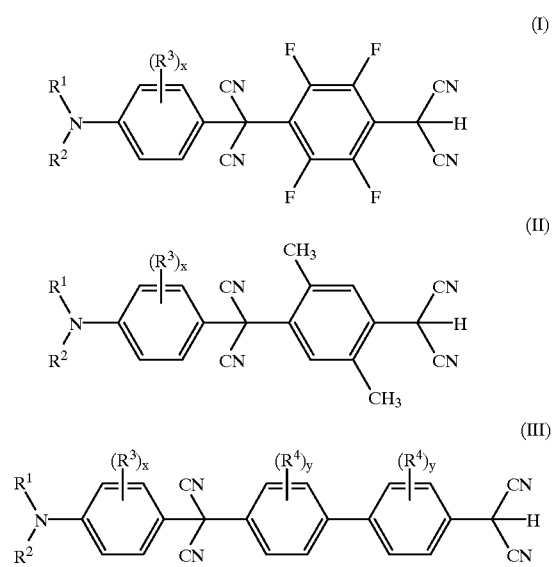

The photoactive component (I)–(III) may be a photoactive compound in admixture with the polymer. Then $R^1$ is hydrogen, deuterium, alkyl, cycloalkyl, alkenyl, cycloalkenyl, aryl, alkylaryl, arylalkyl, or a deuterated equivalent thereof. Alternatively, the photoactive component may be a photoactive moiety chemically bonded to the backbone of the polymer through $R^1$ as a pendent sidegroup. In this case, $R^1$ is an alkylene or alkoxyalkylene radical having from 1 to 6 carbon atoms or a deuterated equivalent thereof.

$R^2$ is independently hydrogen, deuterium, alkyl, cycloalkyl, alkenyl, cycloalkenyl, aryl, alkylaryl, arylalkyl, or a deuterated equivalent thereof. Each $R^3$ and $R^4$ is independently deuterium, alkyl, cycloalkyl, alkenyl, cycloalkeniyl, aryl, alkylaryl, arylalkyl, alkoxyalkyl, aryloxyalkyl, haloalkyl, haloaryl, halogen, or a deuterated equivalent thereof, and x and y are each independently 0 or an integer from 1 to 4.

The polymer component of the positive photochromic material is selected from the group of polyimides, polyesters, polyetherimides, polyesters, polycarbonates, polyurethanes, polyamides, polysiloxanes, polyacrylates, and polystyrene.

In another aspect, the present invention is a polymeric material exhibiting second-order nonlinear optical properties. The polymeric material comprises an electro-optical component and one of the aliphatic or aromatic polymers listed above. The electro-optical component has formula (I'), (II'), or (III')

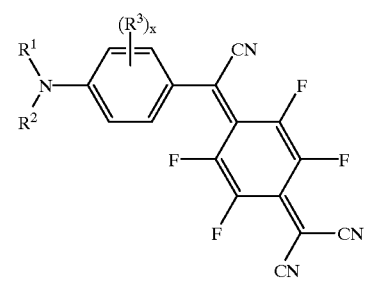

(I')

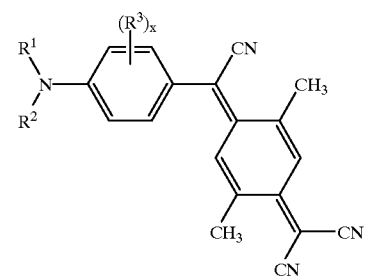

(II')

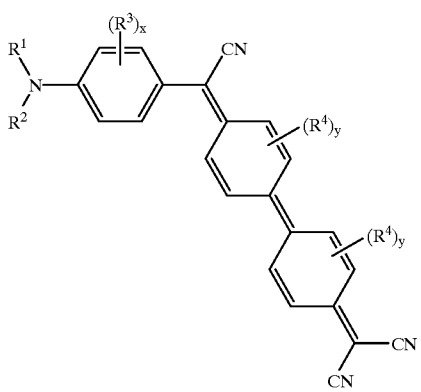

(III')

Similar to tile photoactive components (I), (II), and (III), the electro-optical component may be an electro-optical compound in admixture with the polymer or an electro-optical moiety chemically bonded to the backbone of the polymer through $R^1$ as a pendent sidegroup. The values of $R^1$–$R^4$, x, and y are as previously defined with the electro-optical compound or moiety (I')–(III') being substituted for the photoactive component (I)–(III).

In a method aspect of the present invention, an optical waveguide having electro-optical properties is formed by (a) forming a layer of a photochromic polymeric material dissolved in an organic solvent on a substrate; and (b) subjecting one or more predetermined regions of the layer to actinic radiation at a wavelength and in an amount of intensity sufficient to produce a chemical change in the photoactive compound or pendent sidegroup contained in the photochromic polymeric material. An electro-optical polymeric material is thereby produced in the predetermined regions which has a higher refractive index relative to the photochromic polymeric material. The unexposed photochromic polymeric material serves as the cladding of the waveguide, and the electro-optical polymeric material serves as the core. Preferably, after irradiation, the layer is heated at a temperature and for a time sufficient to remove the solvent.

In step (a) of the method, the photochromic polymeric material used to form the layer includes one of the aliphatic or aromatic polymers listed above, and a photoactive component. The photoactive component has formula (V) or (III) below and may be a photoactive compound in admixture with the polymer or a photoactive moiety chemically bonded through $R^1$ as a sidegroup to the backbone of the polymer.

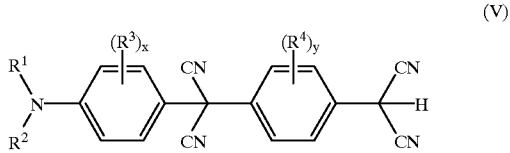

(V)

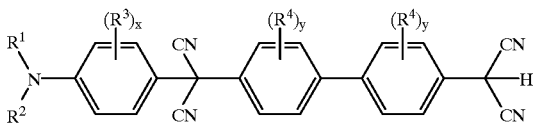

(III)

The values of $R^1$–$R^4$, x, and y are as previously defined.

The electro-optical polymeric material produced in step (b) of the method of the invention preferably comprises the aliphatic or aromatic polymer and an electro-optical component, which is produced upon irradiation of the selected photoactive compound or photoactive moiety having formula (V) or (III). The electro-optical component is in admixture with the polymer or appended as a sidegroup through $R^1$ and has corresponding formula (V') or (III'), respectively.

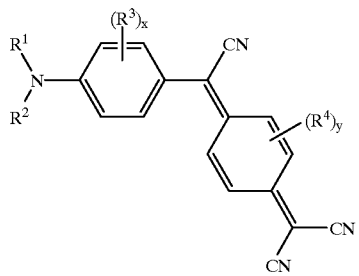

(V')

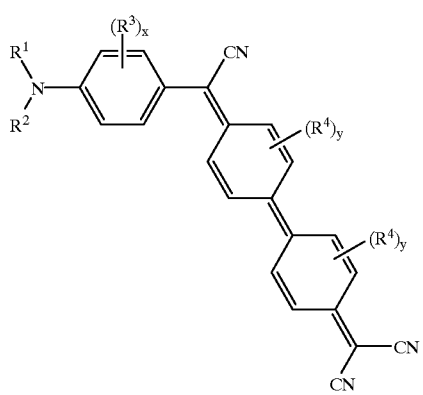

(III')

The values of $R^1$–$R^4$, x, and y are as previously defined with the electro-optical compound or moiety (V') or (III') being substituted for the photoactive component (V) or (III).

In yet another aspect, the present invention is an optical waveguide structure comprising a light transmitting core and a cladding material partially or entirely enclosing the core. The light transmitting core is an electro-optical polymeric material, as described above, containing an electro-optical compound or moiety having formula (V') or (III') in admixture with a first polymer or chemically bonded to the backbone of the first polymer through $R^1$ as an electro-optical pendent sidegroup. The cladding material is a photochromic polymeric material which exhibits a lower refractive index relative to that of the electro-optical polymeric material. The photochromic polymeric material comprises a second aliphatic or aromatic polymer identical in structure with the first polymer and a photoactive component. The photoactive component is a photoactive compound or moiety having formula (V) or (III) in admixture with the second polymer or chemically bonded to the backbone of the second polymer through $R^1$ as a photoactive pendent sidegroup. The photoactive component has formula (V) when the electro-optical component has formula (V'), and the photoactive component has formula (III) when the electro-optical component has formula (III').

In still another aspect, the present invention is an optoelectronics device comprising a substrate holding at least a portion of a first, elongate waveguide propagating an optical signal along a propagation axis thereof, and a second waveguide positioned in optical proximity to the portion of the first waveguide. The optical waveguide structure of the present invention described above forms the second waveguide of the optoelectronics device. The second waveguide has a propagation axis aligned with the propagation axis of the portion of the first waveguide. The second waveguide is used for coupling optical energy to or from the optical signal propagating in the first waveguide.

In yet another aspect, the present invention is an optical structure, typically an integrated optical structure, comprising an optical circuit disposed atop a substrate. The optical circuit comprises at least two optical devices and an optical waveguide, wherein each of the optical devices is optically coupled to and physically separated by a portion of the optical waveguide. The optical waveguide structure of the present invention described above is used as the optical waveguide in the inventive optical structure.

Advantages afforded by the optical waveguide structures of the present invention over present waveguides include higher electro-optical coefficients, greater long-term stability, and easier processing. The improvements in long-term stability are a consequence of the positive photochromic systems of the present invention; whereby fabrication of thin film devices in the proper environment can substantially reduce, if not eliminate, the "bleaching" that plagues current negative systems. Finally, because of the nature of the photochromic reaction of this invention, standard photolithographic techniques can be applied to create photonics devices, eliminating the need for such methods as "trench and fill" and "bleaching". These improvements translate into optoelectronic devices and structures having improved performance and reliability, and substantially easier fabrication.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE INVENTION

Figure 1A:
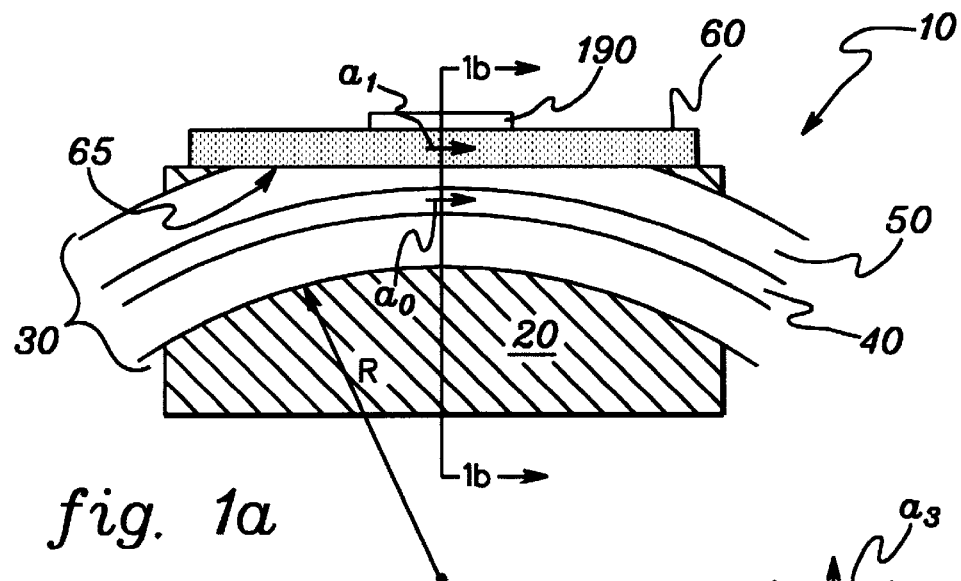
FIGS. 1a–c are cross-sectional and perspective views of an optoelectronics device wherein a polymeric channel waveguide is placed in optical proximity to a side-polished fiber optic to form a compound waveguide structure, in accordance with the principles of the present invention.

As stated above, the present invention offers advantages over prior art negative optical waveguide systems and alternate methods of preparation. Importantly, the bleaching process, so problematic in negative polymer waveguide systems can be avoided because the present positive photochromic materials use an inverted process. That is, the waveguide region is created by exposing the core to actinic radiation and elevating the refractive index of the exposed region. In addition, the present materials which exhibit both photochromic and NLO properties are extremely well-suited for constructing both passive and active optical waveguide systems for use in optical devices, such as optical modulators, filters, amplifiers, attenuators, frequency converters, and electric field sensors, among others. Also, the present photochromic polymer materials offer the potential for fabricating optical waveguide structures with great ease and with a high degree of accuracy. The present technique for forming waveguides is applicable to all major classes of waveguides known to those of skill in the art, i.e. slab, channel, and rib waveguides.

Unless otherwise indicated, the reactants and reagents used in the reactions described below are readily available materials. Such materials can be conveniently prepared in accordance with conventional preparatory procedures or obtained from commercial sources. Deuterated compounds for use in the preparation of deuterated polymeric materials may be prepared using deuterated reactants in the reactions.

As used herein, the term "actinic radiation" refers to light in the ultraviolet (UV) region of the spectrum. The source of ultraviolet light may be in the form of incoherent light or from a coherent source such as a laser.

The positive photochromic materials of the present invention are organic polymeric materials which are characterized by their ability to undergo a photochemical change upon irradiation with actinic radiation, whereby a material having a higher refractive index is produced. The photochromic materials include a polymer and a photoactive component. The photoactive component, represented by structures (I)–(II) above, includes compounds and moieties similar in structure to tetracyanoquinodimethane (TCNQ)/aniline. When the photoactive component is attached to the polymer as a pendent sidegroup, a covalent bond exists from structural moiety (I), (II) or (III) through $R^1$ to the backbone of the polymer. When the photoactive compound is in admixture with the polymer host, a photochromic polymeric matrix is generated. In structures (I)–(III), substituents $R^1$–$R^4$, x, and y are as defined above. In preferred embodiments, x and y are both 0.

With respect to substituents $R^1$–$R^4$, "alkyl", as used herein, refers to saturated hydrocarbon residues containing twenty or fewer carbons in straight or branched chains, as well as cyclic structures, which are referred to as "cycloalkyl". "Alkoxy", alone or in combination, refers to the same residues, containing, in addition, an oxygen atom at the point of attachment. "Alkenyl" refers to unsaturated aliphatic hydrocarbon residues containing twenty or fewer carbons and having one or more double bonds, and "cycloalkenyl" refers to the cyclic structures. "Aryl"

includes phenyl, substituted phenyl, naphthyl and the like; "aryloxy" also includes an oxygen atom at the point of attachment. "Alkoxyalkyl" and "aryloxyalkyl" include methoxymethylene, ethoxymethylene, methoxyethylene, butoxymethylene, propoxyethylene, phenoxymethylene, phenoxyethylene, and the like; "arylalkyl" and "alkylaryl" include phenylethyl, phenylpropyl, benzyl, methylphenyl, ethylphenyl, and the like. "Haloalkyl" and "haloaryl" include chloromethyl, 3-chloropropyl, 3,4-dichlorophenyl, dichloromethyl, trichloromethyl, fluoromethyl, difluoromethyl, trifluoromethyl, phenoxyphenyl, 4-methylphenyl, 2,4-dimethylphenyl, and the like. In addition, substituents $R^1$–$R^4$ may deuterated such that at least one hydrogen is replaced with the deuterium isotope. The term "halogen" means fluorine, chlorine, bromine, or iodine.

The photoactive component (I)–(III) may be prepared by reacting an aromatic amine of structure (VII) below with a tetracyano compound, Such as tetrafluorotetracyanoquinodimethane having structure (VIIIA), 2,5-dimethyl-7,7,8,8-tetracyanoquinodimethane of formula (VIIIB), or compounds of structure (VIIIC), preferably 13,13,14,14-tetracyanodiphenylquinodimethane, wherein y is 0. The reactions are depicted as:

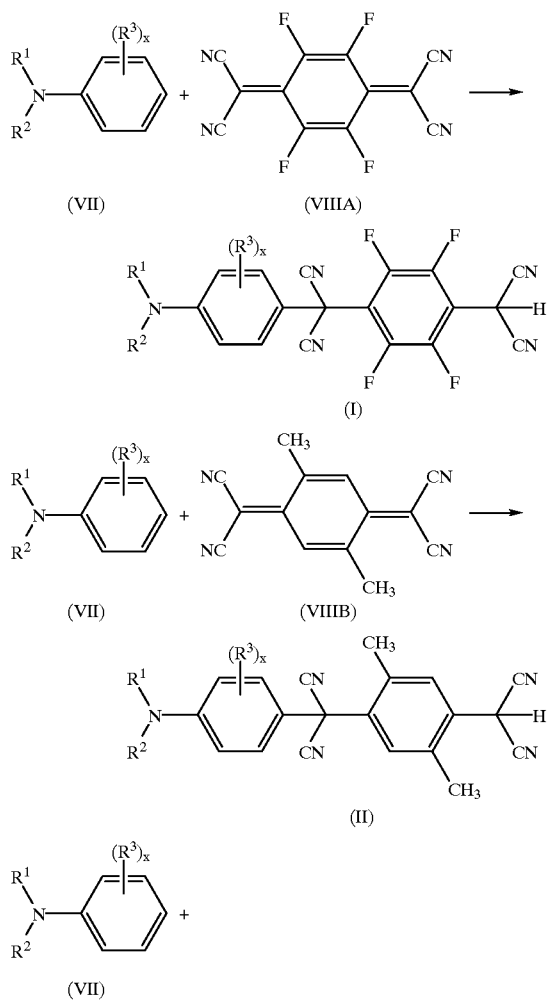

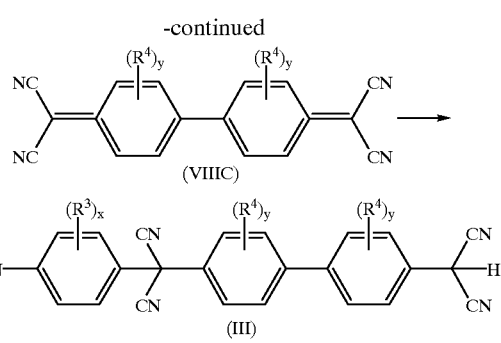

where $R^1$–$R^4$, x, and y are as previously defined. The reaction is carried out under the conditions described by Bespalov et al. for the reaction of tetracyanoquinodimethane (TCNQ) and aniline or the N-alkyl and N-aryl derivatives of aniline (*J. Org. Chem. USSR* (*Engl. Transl.*) 10, 1072–1077 (1974)). Polar aprotic solvents such as dimethyl sulfoxide (DMSO), N,N-dimethylacetamide (DMAc), N-methyl-2-pyrrolidinone (NMP). or N,N-dimethylformamide (DMF) may be used as an organic solvent to prepare the solution of aromatic amine (VII) and tetracyano compound (VIIIA)–(VIIIC). DMSO is the preferred solvent as it provides the best combination of solubility and stability.

Suitable organic polymers for use in combination with the photoactive component (I)–(III) include both aliphatic and aromatic polymers, such as polyimides, polyethers, polyetherimides, polyesters, polycarbonates, polyurethanes, polyamides, polysiloxanes, polyacrylates, and polystyrene. As used herein, the term "aliphatic" refers to polymers characterized by straight- or branched-chain arrangement of constituent carbon atoms. The term "aromatic" refers to unsaturated cyclic hydrocarbons containing one or more rings. It is preferable that the polymer have a molecular weight high enough to form high quality thin (0.1–10 μm) films. Typically, a weight average molecular weight of 5,000–100,000 is sufficient. In addition, it is preferable that the polymer have a high glass transition temperature to prevent decomposition of the polymer composition during processing. A glass transition temperature (Tg) between 90° C. and 250° C. is generally adequate. Examples of preferred polymers include poly(methyl) methacrylate (PMMA), polycarbonates derived from bisphenol A, polystyrene (PS), and polysulfones derived from bisphenol A.

In order to facilitate dissolution of the polymer, it is preferable to add a solvent, referred to herein as a "second solvent" to the polymer prior to mixing with the photoactive component. Suitable solvents include tetrachloroethane, methylene chloride, chloroform, chlorobenzene, chlorotoluene, tetrahydrofuran, and anisole. Thus, the positive photochromic material may include an organic solvent which comprises one of the polar aprotic solvents listed above and optionally, the second solvent mixed in solution therewith. A preferred photochromic polymer solution contains 5 to 40% by weight of polymer in the second solvent, with 0.05% to 15% by weight of the photoactive component prepared from a 1 to 1 mixture of aromatic amine (VII) and tetracyano compound (VIIIA), (VIIIB), or (VIIIC) in the polar aprotic solvent. The weight percentage of the organic solvent (polar aprotic solvent and second solvent) is preferably from about 45% to 95%.

As stated above, photochromic materials of the present invention in which the photoactive compound (I)–(III) is in admixture with a polymer host form a photochromic polymeric matrix. The following example illustrates a novel photochromic material in which photoactive compound (I) is mixed as a dopant with a polycarbonate host. However, it should be noted that the examples included herein are for illustrative purposes only, and the invention is in no way limited to the embodiments used in the examples.

EXAMPLE 1

A polymer solution (4 g) of virgin LEXAN® 100 is dissolved in 18 mL of tetrachloroethane. LEXAN® 100 is a bisphenol A (BPA) polycarbonate commercially available from General Electric. A solution of 200 mg (0.97 mmol) of dibutylaniline, and 267 mg (0.97 mmol) of tetrafluorotetracyanoquinodimethane (VIIIA) in 1 g of DMSO is prepared. The two solutions are mixed together to give a clear solution, which is then filtered through a 0.2 micron filter. A photochromic material containing photoactive compound (I) in admixture with BPA polycarbonate (LEXAN® 100) is obtained. The concentration of the photoactive compound (I) is 1.4% by weight; that of the polymer is 11.7% by weight; and that of DMSO and tetrachloroethane is 86.9% by weight. In structure (I), $R^1$ and $R^2$ are both butyl, and x is 0.

When the photoactive component of the photochromic material is a photoactive moiety chemically bonded to the backbone of the polymer through $R^1$ as a photoactive pendent sidegroup, the resulting photochromic polymer contains structural units (IV) and (IVA) represented as

$A^1$ and $A^2$ are each structural monomers that upon polymerization form the aliphatic or aromatic polymer component of the photochromic material. $B^1$ is the photoactive moiety (I)–(III) chemically bonded through $R^1$ as a pendent sidegroup. Preferably, $R^1$ in moieties (I), (II), and (III) is an ethylene radical, and $R^2$ is a methyl group. Also, x and y are preferably both 0. The mole fraction of structural units (IV) is given by "n", which has a numeric value from about 0.01 to 1. The mole fraction of structural units (IVA) is given by "1−n" and has a value varying from about 0 to 0.99.

The novel photochromic polymers having structural units (IV) and (IVA) may be prepared by attaching a compound of structure (VIIIA), (VIIIB), or (VIIIC) covalently to a precursor polymer. The precursor polymer corresponds to structure (VII) above in which an anilino substituent is attached as a pendent sidegroup. $R^1$ links the anilino substituent to the backbone of the polymer. The precursor polymer containing the anilino sidegroup may be formed by the copolymerization of monomer $A^2$ and an aniline-containing derivative of monomer $A^1$. Alternatively, the aniline derivative may be attached as a sidegroup to the polymer after polymerization is completed. The compound of structure (VIIIA), (VIIIB), or (VIIIC) then adds to the aniline derivative sidegroup (VII) to produce tile appended photochromic polymer comprising units (IV) and (IVA).

For example, the photochromic material may be an appended polymethacrylate polymer, wherein structural units (IV) and (IVA) may be represented as

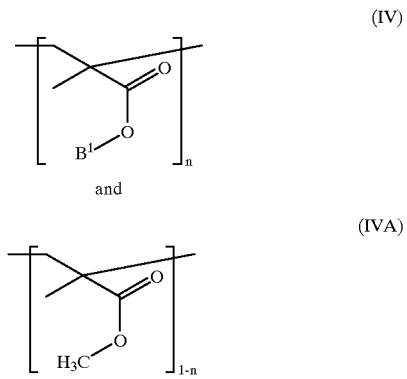

In this case, the novel polymethylmethacrylate photochromic material may be prepared by attaching a compound of structure (VIIIA), (VIIIB), or (VIIIC) covalently to an aniline-containing methacrylate precursor polymer, which corresponds to the aromatic amine of structure (VII). A free radical initiator such as 2,2'-azobisisobutyronitrile (AIBN) may be used to effect the copolymerization. The synthesis is depicted in Scheme 1 using tetrafluorotetracyanoquinodimethane (VIIIA) as the tetracyano compound.

Scheme 1

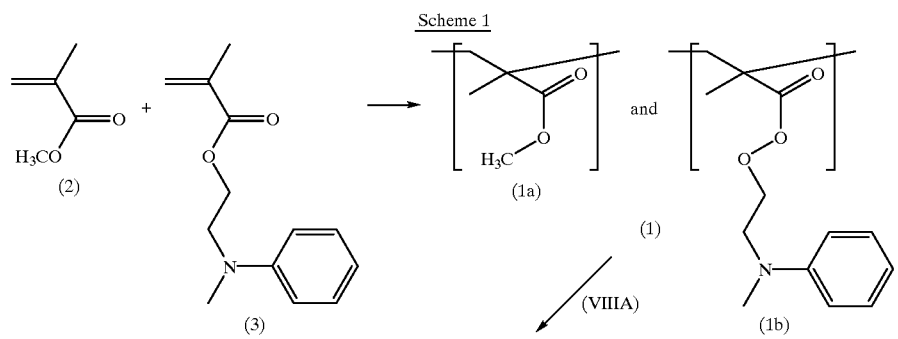

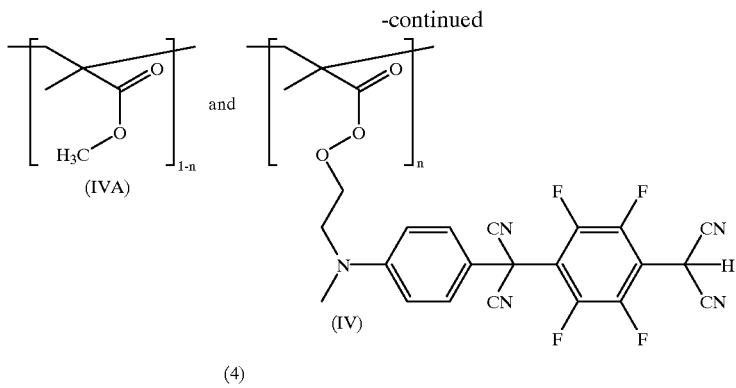

The aniline-containing methacrylate precursor polymer (I) having structural units (1a) and (1b) is prepared by copolymerizing an aniline-containing methacrylate (3) and methyl methacrylate (2) using a free radical initiator, such as AIBN. After polymerization, the precursor polymer (1) is reacted with a compound having structure (VIIIA), (VIIIB), or (VIIIC) to form the photochromic polymeric material (4) comprising structural units (IV) and (IVA). An experimental example is provided in Example 2.

EXAMPLE 2

(I) Preparation of Precursor Polymer (1)

A 200 mL flask was charged with methyl methacrylate (2), (19 g, 0.190 mol), aniline-containing methacrylate (3), (1 g, 0.00456 mol), AIBN (0.33 g, 1.99 mmol), dodecylthio (0.20 g, 1.0 mmol), and toluene (50 mL). The solution was degassed, filled with argon, and heated at 70° C. for 12 hours. A viscous solution containing precursor polymer (1) was formed. The precursor polymer was concentrated and poured into 500 mL methanol. The white polymer, which precipitated out of solution, was collected by suction filtration and then dried in a vacuum oven at 80° C. for 8 hours. About 18 g of the desired aniline-containing methacrylate precursor polymer (1) was obtained.

(ii) Preparation of Photochromic Polymer Material

Four grams (4 g) of aniline-containing methacrylate precursor polymer (1) and 251 mg (0.91 mmol) of tetrafluorotetracyanoquinodimethane (VIIIA) is dissolved in 18 mL of DMSO, then filtered through a 0.2 micron filter. The polymethacrylate photochromic material of formula (4) comprising randomly distributed structural units (IV) and (IVA), wherein structural unit (IV) is appended with structure (I), as depicted in Scheme 1, is obtained. $R^1$ is an ethylene radical; $R^2$ is methyl; x is 0; n is 0.02; and 1−n is 0.98.

Similarly, another embodiment includes polyimides having pendant photoactive sidegroups (I)–(III) thereon. In this case, structural units (IV) and (IVA) are represented

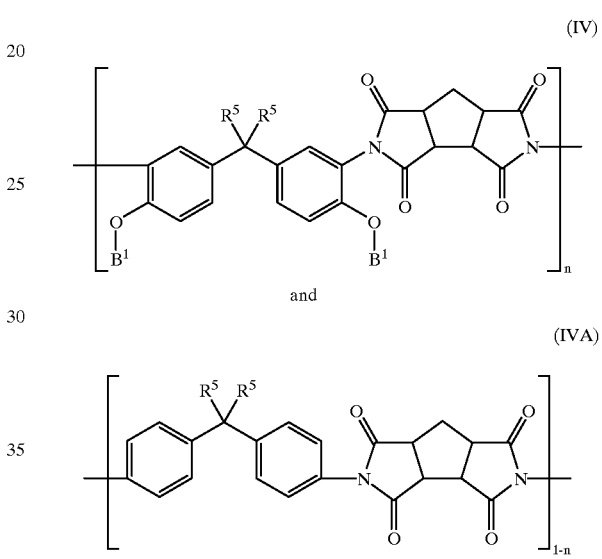

$R^5$ may be either methyl, trifluoromethyl, or a deuterated equivalent thereof. $B^1$, n, and 1−n are as previously defined.

The following example illustrates the preparation of a polyimide photochromic material, wherein the polyimide backbone is appended with photoactive component (I); x is 0; $R^1$ is an ethylene radical; and $R^2$ is methyl.

EXAMPLE 3

(I) Preparation of Precursor Polymer

The reaction was conducted in an argon-filled glove box. A 250 mL flask was charged with cycloaliphatic dianhydride (5.00 g, 0.0238 mol), 2,2-bis(3-amino-4-hydroxyphenyl)-1, 1,1,3,3,3-hexafluoropropane) (4.36 g, 0.0119 mol) hexafluorobisphenol A diamine (i.e. 2,2-bis(4-aminophenyl)-1,1,1,3, 3,3-hexafluoropropane) (4.01 g, 0.0119 mol), and NMP (70 g), and the solution was stirred at room temperature for 24 hours. Tile solution was removed from the glove box, and toluene (15 mL) was added. The polyamic acid solution was thermally imidized by azeotropic distillation at 175° C. for 6 hours. The solution was poured into 500 mL of water with stirring, and the polymer that precipitated was collected by filtration and dried at 180° C. for 12 hours. The desired hydroxyl containing polyimide (5) comprising randomly distributed structural units (5a) and —[$A^2$]— was obtained as a cream-colored solid.

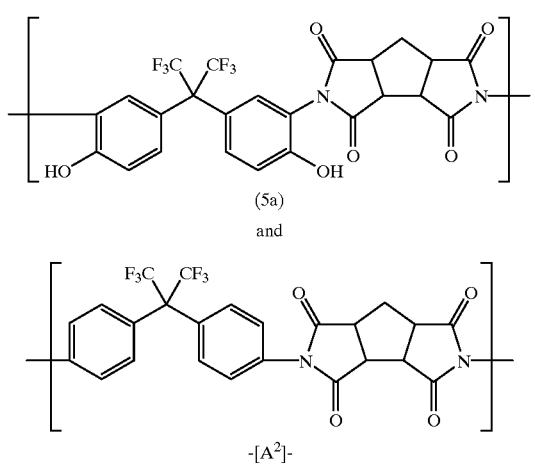

(5a)

and

-[A²]-

A 100 mL 3-neck flask was charged with triphenylphosphine (0.78 g, 2.97 mmole), hydroxyl-containing polyimide (5) (1.35 g, 1.29 mmole), and THF (40 mL). The mixture was stirred for approximately 30 min. until all the polymer was dissolved. 2-(N-methylanilino)ethanol (0.448 g, 2.97 mmol) was added, then the solution was cooled to −60° C. Diethylazodicarboxylate (0.467 mL, 2.97 mmol) was added by syringe. The temperature of the solution was slowly brought up to 20° C. over an 8 hour period and stirred at room temp for another 4 hours. The solvent was evaporated, and the polymer was removed from the flask with the aid of methanol. The crude polymer was then subjected to soxhlet extraction with methanol for 24 hours, and dried at 120° C. under vacuum overnight to give aniline-containing polyimide (6) comprising randomly distributed structural units (6a) and —[A²]—.

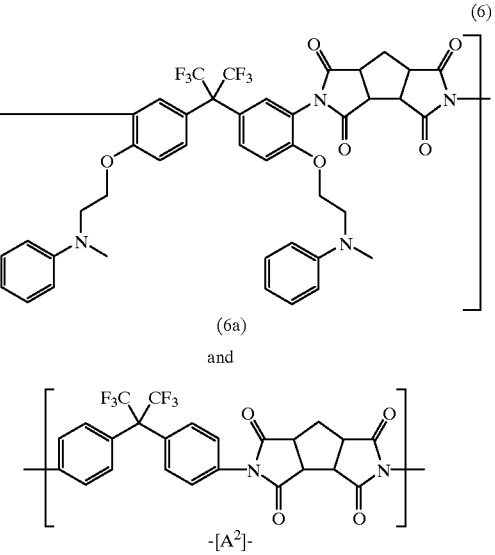

(6a)

and

-[A²]-

(ii) Preparation of Photochromic Polymer Material

One gram (1 g) of the aniline-containing precursor polyimide (6) and 419 mg of tetrafluorotetracyanoquinodimethane (VIIIA) is dissolved in 4.5 mL of DMSO, then filtered through a 0.2 micro filter. The polyimide photochromic material (7) comprising randomly distributed structural units (IV) and (IVA), wherein structural unit (IV) is appended with structure (I), as shown below, is obtained. $R^5$ is trifluoromethyl; $R^1$ is an ethylene radical; $R^2$ is methyl; x is 0; n is 0.50; and 1−n is 0.50.

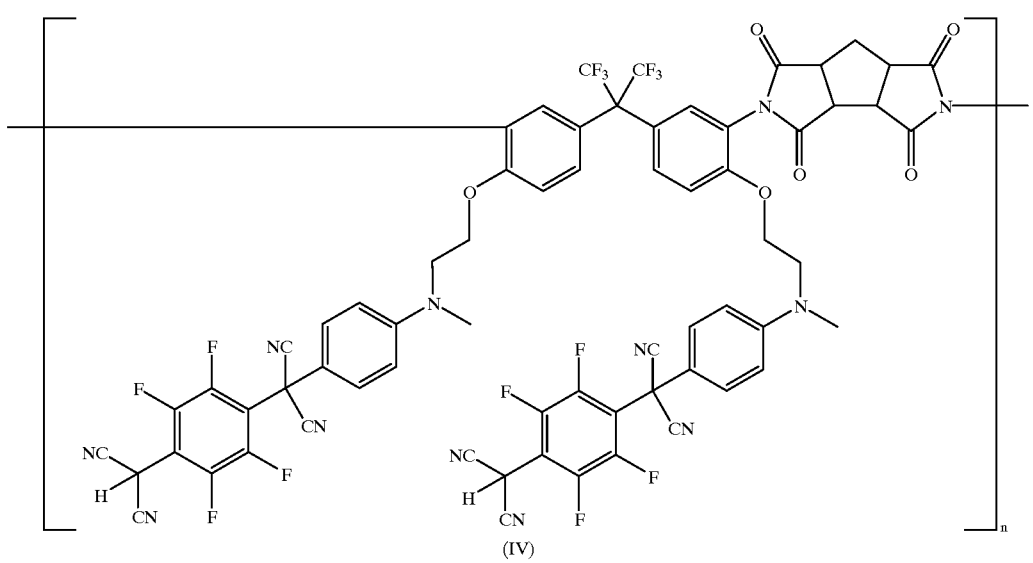

(IV)

and

-continued

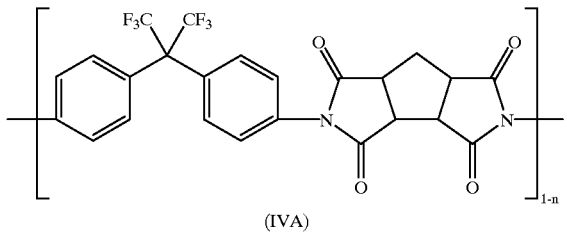

(IVA)

Each of the photochromic materials described above possesses a UV absorption band from 250 to 350 nm. When irradiated by light within this band, the material turns from colorless to dark green, as an intense absorption band at a longer wavelength within the visible and near infrared (NIR) regions (from 600 to 800 nm) is generated. This causes the refractive index of the irradiated material to increase. In addition, each of the novel photochromic materials described above undergoes an irreversible photochemical change. The resulting polymeric materials have a different chemical structure and exhibit excellent second-order non-linear optical properties after poling, making them useful as the core region in active waveguides. The present invention includes these new polymeric materials prepared photochiemically from the novel photochromic polymers.

The new polymeric materials of the present invention contain an electro-optical component similar in structure to tetracyanoquinodimethane (TCQ). As used herein, the term "electro-optical" refers to materials which possess second-order nonlinear optical (NLO) properties. The electro-optical components (I')–(III') and (V') are characterized by their substantially planar and highly electron-delocalized chemical structures, and widely separated electropositive and electronegative groups. Polymers containing these groups may be "poled" to orient the components head to tail. "Poling" is a term well-known in the art which refers to the process of aligning the individual dipole moments of a nonlinear optical component of a polymer by placing a large external electric field across the material at an elevated temperature (at or above its Tg). The interaction with the electric field causes the dipolar species to align in the direction of the applied field. If the polymer is then cooled to its glassy state with the field applied, the field induced non-centrosymmetric alignment is frozen into place, and the material exhibits second-order nonlinear optical properties. Thus, after electric field poling, the electro-optical polymers discussed herein are suitable for second-order NLO applications which require dyes having asymmetry and a high degree of electron delocalization.

The irreversible photochemical reaction of photoactive components (I), (II), and (III) upon exposure to actinic radiation produces electro-optical components (I'), (II'), and (III'), respectively, where $R^1$–$R^4$, x, and y are as previously defined. Preferably, x and y are both 0.

Like the photochromic materials described above, the novel polymeric materials exhibiting second-order nonlinear optical properties include one of the aliphatic or aromatic polymers listed above. In addition, the materials contain all electro-optical component (I'), (II'), or (III'), which is either a compound in admixture with the polymer or a moiety appended to or chemically bonded to the polymer as a pendent sidegroup. The polymeric material preferably includes an organic solvent, as defined above.

The novel polymeric materials may be prepared by exposing a polymer doped with a photoactive compound of structure (I), (II), or (III) to actinic radiation. Irradiation produces a polymer in admixture with electro-optical compound (I'), (II'), or (III'), respectively. Alternatively, compounds containing, photoactive components (I), (II), or (III), preferably in solution with an aforementioned polar aprotic solvent, can be irradiated with actinic radiation prior to mixing with the polymer, which is preferably dissolved in a second solvent as defined above. The procedure previously described for doping can then be followed substituting the electro-optical compound for the photoactive compound.

When the electro-optical component is a moiety appended to the polymer, the novel polymeric material comprises structural units (IV') and (IVA'), wherein $A^1$ and $A^2$ are as previously defined, and $B^2$ is the electro-optical pendent sidegroup, i.e. (I'), (II'), or (III'), which is chemically bonded to the backbone of the polymer through $R^1$. $R^1$ is preferably an ethylene radical, and $R^2$ is preferably a methyl group.

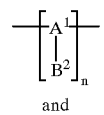

and

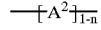

The mole fraction of structural units (IV'), designated as n, will have the same numeric value as that of structural units (IV) from which they are formed, the value being from about 0.01 to 1. Likewise, 1–n, the mole fraction of structural units (IVA'), will be the same as that of (IVA). Alternatively, structural components (I'), (II'), or (III') can be formed by irradiation prior to appending the polymer. The procedure for adding pendent sidegroups to the polymer outlined above with respect to (I), (II), and (III) can then be followed substituting the electro-optical component for the photoactive component.

The present invention also includes novel optical waveguide structures which exhibit excellent second-order NLO or electro-optical properties and a method for forming these novel waveguides. The present method replaces traditional complex techniques for patterning a waveguide structure with a simple, low cost, and extremely accurate two step process. The key of the new technology is the photochromic polymer that induces a change in the refractive index upon exposure to actinic radiation.

According to the first step of the present method, a layer of a photochromic polymeric material containing a photoactive component is formed on a suitable substrate. The photochromic polymeric material is dissolved in an organic solvent, such as one of the polar aprotic solvents previously listed. A second solvent, also listed above, may optionally be added to the organic solvent to aid in application of the material onto the substrate. The layer may be formed by any known method such as spin casting, dip coating, roller coating, doctor blading, or evaporating. Preferably, the photochromic polymeric material is spin cast into a thin film, typically having a thickness from about 0.5 μm to about 10 μm. Films of extremely accurate thicknesses can be formed by applying solutions of predetermined viscosities in this manner onto the substrates.

The substrate may be any material upon which it is desired to establish a waveguide, such as semiconductor materials (silicon, silicon oxide, gallium arsenide, silicon nitride, silica on silicon, etc.), as well as glass, plastics, quartz, ceramics, or crystalline materials. The substrate may or may not contain electrical or opto-electrical devices therein. The surface of the substrate is preferably planar.

Suitable photochromic polymeric materials for deposition on the substrate include the novel positive photochromic materials of the present invention described above which contain photoactive components (I), (II), and (III). However, the method is not limited to the use of the inventive materials disclosed herein, but may also be practiced using as the photoactive component substituted and unsubstituted tetracyanoquinodimethane (TCNQ)/aniline or TCNQ/N-alkyl or N-aryl substituted aniline chromophores, which are described by Bespalov et al. in *J. Org. Chem. USSR (Engl. Transl.)* 10, 1072–1077 (1974). It should be noted that, until now, the usefulness of polymers containing TCNQ/aniline or its chromophores in the fabrication of passive or active optical waveguide systems has not before been recognized.

Thus, the photochromic polymeric materials useful in forming a waveguide include an aliphatic and aromatic polymer, as described above, and a photoactive component, which is a compound or moiety having structure (V) or (III), wherein $R^1$–$R^4$, x, and y are as previously defined. Preferably, in structures (V) and (III), both x and y are 0. With respect to structure (V), this embodiment includes compounds and moieties derived from TCNQ/aniline, N-alkyl-aniline, and N-aryl-aniline. In another preferred embodiment, x is 0 in structure (V); y is 4; and each $R^4$ is fluorine. In yet another embodiment of structure (V), x is 0; y is 2; and each $R^4$ is a methyl group in a 2,5 or 3,6 relationship.

The photoactive component (V) or (III) may be a photoactive compound in admixture with the polymer or a moiety appended as a sidegroup to the polymer. The procedure presented above for preparing novel photochromic materials containing photoactive compounds and moieties (I)–(III) in admixture with or appended to the polymer may also be followed for preparing photochromic compositions containing (V) or (III) for use in fabricating a waveguide.

When the photoactive component is a photoactive moiety chemically bonded to the backbone of the polymer through $R^1$ and is a photoactive pendent sidegroup, then the photochromic polymeric material may be represented by structural units (VI) and (VIA)

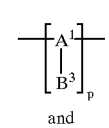

(VI)

and

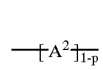

(VIA)

$B^3$ is the photoactive pendent sidegroup of formula (V) or (III). Preferably, $R^1$ is an ethylene radical; $R^2$ is a methyl group; and x is 0. In formula (III), y is also preferably 0. In formula (V), y is preferably 0, 2, or 4. When y is 2 in formula (V), the $R^4$s are preferably methyl groups in a 2,5 or 3,6 relationship, and when y is 4, each $R^4$ is preferably fluorine. $A^1$ and $A^2$ are each structural monomers, as defined above. The mole fraction of structural units (VI) in the photochromic polymeric material is given by p, which has a numeric value from about 0.01 to 1. The mole fraction of structural units (VIA) is given by 1–p.

The procedure provided in Examples 1–3 above for preparing the novel photochromic materials of the present invention may be followed for preparing the photochromic polymeric material for deposition as a layer onto a substrate. The following additional examples illustrate the use of TCNQ in preparing a photochromic polymeric material for use in the present method.

EXAMPLE 4

The procedure of Example 1 was followed except that 200 mg (0.97 mmol) of tetracyanoquinodimethane (TCNQ) was substituted for tetrafluorotetracyanoquinodimethane (VIIIA). A photochromic composition containing photoactive compound (V) in admixture with BPA polycarbonate (LEXAN® 100) was obtained. The concentration of the photoactive compound (V) was 1.4% by weight; that of the polymer was 11.7% by weight; and that of the solvent was 87% by weight. In structure (V), $R^1$ and $R^2$ were both butyl, and x was 0. The photochromic polymeric composition was ready to spin on a substrate for patterning.

EXAMPLE 5

The procedure of Example 2 was followed, except that in step (ii), 186 mg (0.91 mmol) of TCNQ was substituted for tetrafluorotetracyanoquinodimethane (VIIIA). A polymethylmethacrylate photochromic composition comprising randomly distributed structural units (VI) and (VIA) was obtained, wherein structural unit (VI) was appended with structure (V). $R^1$ was an ethylene radical; $R^2$ was methyl; x was 0; p was 0.02; and 1–p was 0.98.

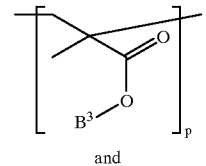

(VI)

and

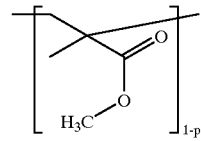

(VIA)

The photochromic polymeric composition was ready to spin on a substrate for patterning.

EXAMPLE 6

The procedure of Example 3 was followed, except that in step (ii), 310 mg (1.52 mmol) of TCNQ was substituted for tetrafluorotetracyanoquinodimethane (VIIIA). A photochromic polyimide comprising randomly distributed structural units (VI) and (VIA) was obtained, wherein structural unit (VI) was appended with structure (V), i.e ($B^3$)=(V). $R^5$ was trifluoromethyl; $R^1$ was an ethylene radical; $R^2$ was methyl; x was 0; p was 0.50; and 1–p was 0.50.

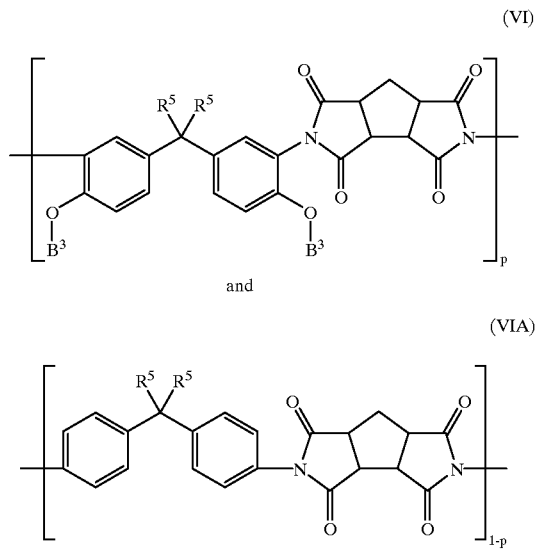

The photochromic polymeric composition was ready to spin on a substrate for patterning.

In the second step of the present method, after the layer of photochromic polymeric material containing compounds or moieties of structure (V) or (III) is formed on the substrate, one or more predetermined regions of the layer is exposed to actinic radiation. Control of which areas of the layer are subjected to irradiation is achieved by either: 1) the use of conventional photolithography; or 2) the use of a directed or focused beam light source. In the first technique, a mask having the desired waveguide pattern is placed between the photochromic polymeric material layer and the source of actinic radiation. The mask has transparent and opaque portions which allow the radiation to pass only through the transparent portions and fall only on the regions of the layer surface where an increase in refractive index is desired. Typically, an incoherent light source is used in the photolithographic technique. In the second technique, the focused or directed beam source is typically a laser. The pattern of the waveguide is accomplished by moving either the substrate or the beam source (while the other remains stationary) in such a way such that the directed beam or focused beam contacts only the desired predetermined regions of the photochromic layer. These directed or focused beam techniques are well-known in the art as "direct-writing" methods. The use of photolithography or direct-writing simplifies processing requirements and therefore makes the present method ideal for practicing on a commercial scale.

The wavelength region and intensity of the actinic radiation must be sufficient to produce a photochemical change in the photoactive compound or pendent sidegroup of structure (III) or (V) of the photochromic material. One advantage of the compositions used in the present method is that the photochemical reaction can be carried out using relatively short wavelength radiation so that exposure of the waveguide to radiation normally encountered in processing or in use (i.e. room lights) will not cause degradation of the waveguide over time. Suitable sources of ultraviolet light within the 200–400 nm region include incoherent light sources such as high pressure xenon or mercury xenon lamps fitted with appropriate optical filters within the desired wavelength band. Coherent light sources include argon-ion lasers or excimer lasers. Frequency doubled argon-ion or excimer lasers having an output near 257 nm may also be used. Preferably, the actinic radiation is in the form of UV light having a wavelength from about 250 to 350 nm. Exposure with a coherent light source involves less time than with an incoherent light source due to increased intensities.

Irradiation of predetermined regions of the colorless photochromic polymeric material layer with actinic radiation causes the photoactive component within the regions to undergo a photochemical change, producing a deeply colored dye. The maximum of the absorption band corresponding to the dye is red-shifted to about 600–800 nm. This dye, referred to herein as an "electro-optical polymeric material", includes appended to or in admixture with the polymer an electro-optical component formed from the photochemical change of structure (V) or (III). The electro-optical component exhibits excellent second-order nonlinearity after poling and has the chemical structure (V') or (III') shown above wherein $R^1$–$R^4$, x, and y are as previously defined. The preferred values of $R^1$–$R^4$, x, and y are the same as those presented above with respect to structures (V) and (III).

In addition, the refractive index of the electro-optical polymer increases relative to that of the unexposed, unaltered photochromic polymeric material. Because of this increase in refractive index, the actinic radiation is directed to contact only the areas of the photochromic polymeric material where the core of the wavelength is to be produced. The surrounding unexposed regions correspond to the cladding of the waveguide. Typically, the core is a stripe having a width of about 1–2 µm.

Depending on whether the photoactive component (V) or (III) of the unexposed photochromic polymeric material is a compound or moiety, the electro-optical component (V') or (III') in the exposed regions will likewise be a compound in admixture with the polymer or a moiety appended thereto as a sidegroup. Thus, with respect to the core of the waveguide prepared by the present method, when the electro-optical component is a moiety chemically bonded to the backbone of the polymer through $R^1$, structure (V') or (III') is an electro-optical pendent sidegroup on the polymer. The polymeric material of the exposed regions or light transmitting core having the electro-optical sidegroup is represented by structural units (VI') and (VIA')

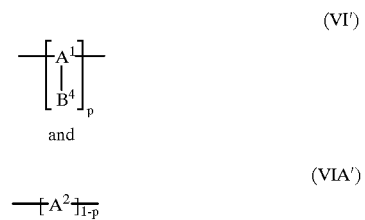

$B^4$ is the electro-optical pendenit sidegroup of formula (V') or (III'), and $A^1$ and $A^2$ are as previously defined. The preferred values of $R^1$–$R^4$, x, and y are the same as those presented above with respect to structures (VI) and (VIA). The mole fraction of structural units (VI') in the core is given by p, which has same numeric value as that of structure (VI), from about 0.01 to 1. The mole fraction of structural units (VIA') is the same as that for units (VIA), given by 1–p.

Typically, after irradiation, the waveguide layer, which now includes both cladding (photochromic polymeric material) and a light-transmitting core (electro-optical polymeric material), is heated at a temperature and for a time sufficient to remove the solvent. It is generally sufficient to dry the optical waveguide structure in an oven overnight at a temperature below the Tg of the polymer, typically about 100° C. for polycarbonates and lower for polyacrylates.

In the absence of electric field poling, the novel waveguide structures described herein are characterized as passive waveguides. However, active waveguides may be formed by positioning at least one electrode onto the waveguide and applying an electric field to "pole", the electro-optical component of the core, as described above. Thus, when a polymer contains a dye of structure (V') or (III') and is subsequently subjected to electric field poling, the non-centrosymmetric necessary for nonlinear optical applications, such as modulation, is achieved. These polymer compositions also exhibit good thermal stabilities and high glass transition temperatures (up to 191° C.), indicating good conformational stability in poled samples. In addition, the materials exhibit high electro-optical (EO) coefficients similar to $LiNbO_3$, the most widely used inorganic crystal for NLO applications, indicating the excellent nonlinear efficiency of the dyes.

Therefore, in accordance with the present method, the heating step may be conducted in the presence of an applied electrical field so as to orient or pole the electro-optical components of the electro-optical polymeric material. After poling, the heating step is followed by a cooling step.

The photochromic polymeric material can be patterned into both slab waveguides and channel waveguides using the above method. A planar or slab waveguide is one in which optical energy is confined only to the plane of the layer, i.e. in only one transverse direction. For use as an active slab overlay waveguide, the polymeric material can be patterned atop a side-polished fiber to create a side-polished fiber modulator. A channel waveguide is one in which optical energy is transversely confined in two transverse directions. When used as a channel overlay waveguide atop a side-polished fiber, the dominant loss mechanism or tile transverse diffraction of light so prevalent in slab overlays can be significantly reduced or even eliminated. As such, channel overlay waveguides may be used as filters where collection of the energy in the overlay is desired or in other devices where eliminating the loss mechanism is advantageous, for example in an amplifier. An active channel waveguide is often employed in NLO and electro-optic devices because it permits light to be directed to certain areas of the substrate as well as providing for splitting and combining with optical waves.

The following examples illustrate the present method of preparing an optical waveguide structure in which the core exhibits electro-optical properties.

EXAMPLE 7

The solution from Example 6 containing a photochromic composition in solvent is placed on a flat substrate and spin cast into a thin film having a thickness of about 0.6 $\mu$m. The film is then placed in a mask alignment system whereby a metallic mask is brought near the film, though not in contact. A 1000 W xenon lamp is used as the ultraviolet source, and the mask-covered polymer is illuminated for about three hours in order to effect the chemical change in the exposed areas. Following illumination, the film is dried in an oven to remove all traces of solvent. A channel waveguide is prepared.

EXAMPLE 8

The solution from Example 6 containing a photochromic composition in solvent is placed on a flat substrate and spin cast into a thin film having a thickness of about 0.6 $\mu$m. An ultraviolet or blue laser (i.e. Ar-ion laser or Excimer laser) is focused onto the photochromic composition and directed to trace out the core of the waveguide structure (bends, tapers, couplers, etc.). Following illumination, the film is dried in an oven to remove all traces of solvent. A channel waveguide is formed.

The present invention also includes the novel optical waveguide structures prepared above using the present method for forming a waveguide. Briefly, these waveguides include a light-transmitting core comprising the electro-optical polymeric materials containing components (III') and (V'). The core exhibits excellent second-order NLO properties after poling with an electric field. In addition, the novel waveguides include a cladding material partially or entirely enclosing the core. The cladding comprises the photochromic polymeric materials discussed above which contain components (III) and (V). Advantageously, the cladding material exhibits negligible second-order polarizability.

More particularly, the light-transmitting core of the present optical waveguide structures comprises a first polymeric material which includes a first aliphatic or aromatic polymer selected from those listed above, and an electro-optical component. The electro-optical component is a compound or moiety having structure (V') or (III'). Likewise, the cladding of the present waveguides is a positive photochromic composition which comprises a photochromic polymeric material containing a second polymer identical in structure to the first polymer, and a photoactive component, which is a compound or moiety having structure (V) or (III). $R^1$–$R^4$, x, and y are as previously defined. Several preferred embodiments for components (III), (III'), (V), and (V') are set forth above. In addition, as provided in Examples 1–6, the electro-optical polymeric material of the core preferably comprises from about 0.1 to 20% by weight of the electro-optical component, and from about 80.0 to 99.9% by weight of the first polymer, and the photochromic polymeric material of the cladding comprises from about 0.1 to 20% by weight of the photoactive component, and from about 80.0 to 99.9% by weight of the second polymer.

Figure 1B:
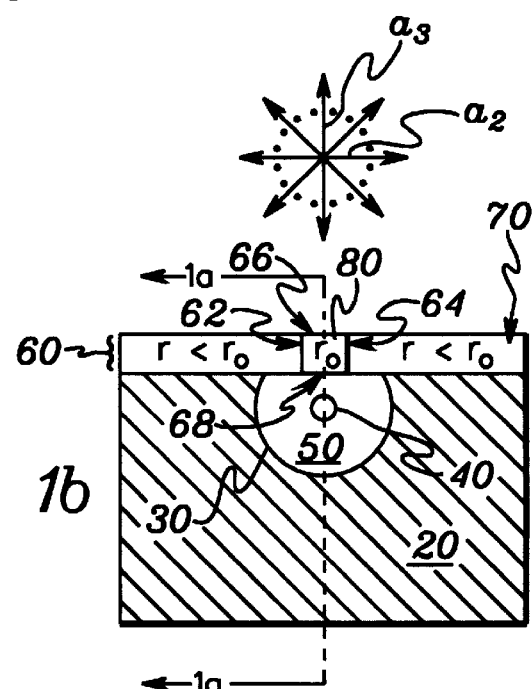
Figure 1C:
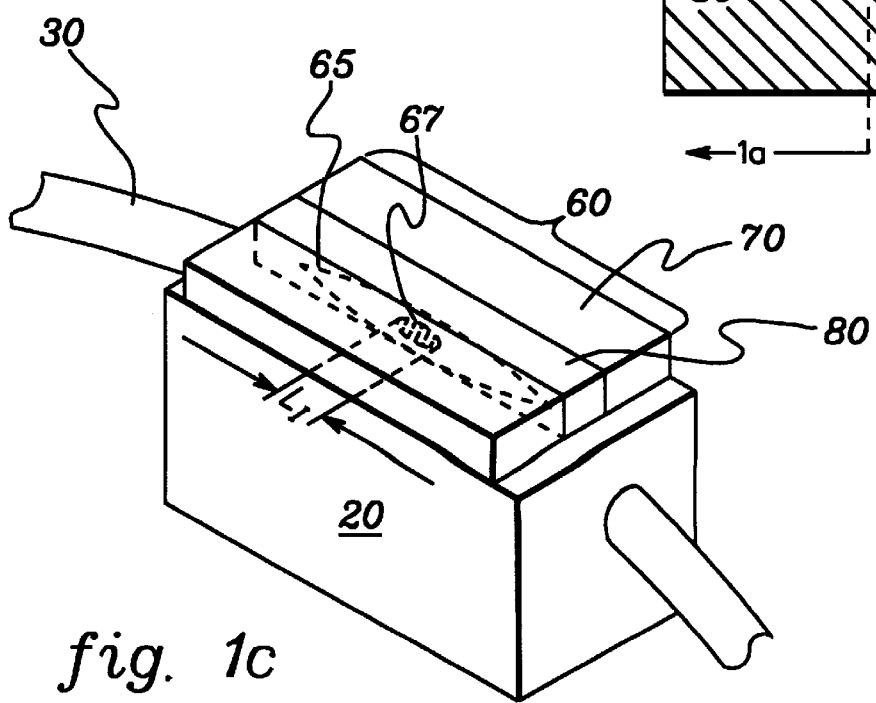

Another aspect of the present invention relates to optoelectronics devices in which the aforementioned novel waveguide structures are incorporated as an essential feature therein. Reference is now made to the drawing figures wherein reference numerals are used throughout multiple figures to designate the same or similar components. FIGS. 1a–c illustrate an exemplary optoelectronics device, generally denoted 10, in accordance with the present invention. The depicted embodiment is a side-polished/channel overlay compound waveguide device 10 which includes substrate 20 having a portion of a first, elongate waveguide 30 running therethrough. First waveguide 30 may comprise, for example, a fiber waveguide, such as a single-mode fiber optic cable having a core 40 encased by cladding 50. The fiber transmits or propagates an optical signal through its core along propagation axis $a_0$ When such a single-mode optical fiber 30 is side-polished close to its core (e.g., to within 5 $\mu$m), optical coupling is possible to second waveguide 60, which is used as an "overlay" waveguide.

Second waveguide 60 comprises one of the novel waveguide structures of the present invention described above and may be a channel overlay waveguide. As aforementioned, a channel waveguide differs from a planar or slab waveguide in that the optical energy is transversely confined in two transverse directions in the former, and in only one transverse direction in the latter.

FIG. 1b is a cross-sectional view of compound waveguide device 10 showing the generally planar polymeric layer 60 deposited over substrate 20 (through which fiber 30 including core 40 and side-polished cladding 50 is run). Second waveguide layer 60 comprises light-transmitting core 80, which comprises an electro-optical polymeric material containing electro-optical component (V') or (III'), and cladding material 70 partially or entirely enclosing the core. Cladding 70 comprises a photochromic polymeric material containing a photoactive component of structure (V) or (III). The electro-optical polymeric material 80 has a refractive index "$r_o$" which is greater than the refractive index "r" of the photochromic polymeric material 70 on either of its sides. Core 80 is formed by depositing a positive photochromic polymeric material onto a side-polished fiber and exposing a predetermined region of photochromic polymeric material in layer 60 to actinic radiation as described above.

In accordance with the invention, second waveguide 60 or channel overlay waveguide 60, is positioned in optical proximity to side-polished portion of first waveguide 30 to provide optical coupling to the evanescent field exposed by the side-polishing of fiber waveguide 30. Evanescent coupling of optical energy occurs at least over an optical interaction area 67 (having interaction length $L_I$) between light-transmitting core 80 of polymeric channel waveguide 60 and fiber waveguide 30. In exemplary device embodiment 10, optical interaction area 67 is substantially determined by the size of the intersection 65 of the planar polished surface of fiber waveguide 30 and the lower, coupling surface of polymeric channel waveguide 60. Interaction length $L_I$ is typically much smaller than the length of channel waveguide 60. Those skilled in the art will recognize that this interaction length $L_I$ can be controlled, in the side-polished fiber optic embodiment, by careful control of the radius (R) of curvature of the fiber optic cable as it passes through substrate 20 in FIG. 1, as well as the depth of the polishing of the fiber or the design of the overlay. In one example, the radius of curvature (R) may be 50 cm, and $L_I$ may be 5 mm. The elongated shape of channel waveguide core 80 provides a propagation axis $a_1$ therein which is longitudinally aligned with propagation axis $a_0$ of fiber waveguide 30. Though FIGS. 1a–c depict a direct contact between waveguides 30 and 60, it will be understood by those skilled in the art that intervening adhesive, transparent electrodes, and/or index matching layers may be present at this interface.

Evanescent coupling occurs between waveguide 30 and channel waveguide 60 in the now exposed evanescent field area of the optical signal transmitted along axis $a_0$ of waveguide 30. This evanescent coupling causes optical energy to be transferred to light-transmitting core 80 of polymeric channel overlay waveguide 60 from the optical signal propagating in fiber optic 30. Core 80 of channel waveguide 60 confines diffraction of coupled optical energy along the axes transverse, or orthogonal, to its axis of propagation $a_1$. When amplification, attenuation, or modulation of the optical signal is desired, coupled optical energy remaining in core 80 of the polymeric overlay substantially directly over the fiber optic is available for coupling back into the fiber optic subsequent to being amplified, attenuated, or modulated. Exemplary transverse axes are depicted in FIG. 1b, including orthogonal axes $a_2$ and $a_3$.

As shown in FIG. 1b, boundaries 62 and 64 between core 80 and cladding 70 of differing indices serve as the optical boundaries which confine the optical energy along the transverse axes. Upper boundary 66 and lower boundary 68 similarly confine the optical energy along the vertical axis. Thus, transverse or lateral diffraction of the coupled optical energy is limited by the optical boundaries 62, 64, 66 and 68 resulting from the confining, generally rectangular cross-sectional shape of core 80.

Figure 2:
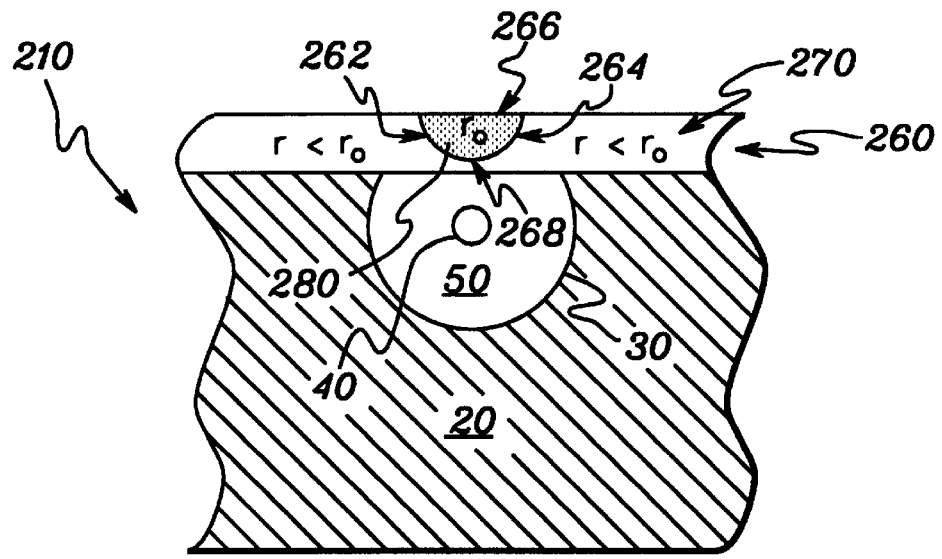
FIG. 2 is a cross-sectional view of an alternate embodiment of the compound waveguide of FIG. 1.

FIG. 2 is a cross-sectional view of compound waveguide device 210 similarly including polymeric waveguide layer 260 deposited over substrate 20 having running therethrough fiber 30 including core 40 and cladding 50. In this embodiment, channel waveguide core 280 is formed by permitting actinic radiation to penetrate to predetermined depths of the photochromic polymeric layer. Channel waveguide core 280 has an index of refraction "$r_o$" greater than the index "r" of the remaining portions of cladding 270. Optical boundaries 262 and 264 are formed on either side of core 280 which effect a transverse confinement of the coupled optical energy, and confinement is also effected along the vertical axis by surfaces 266 and 268.

Discussed above is the use of a channel waveguide in its passive mode, wherein the coupling characteristics are determined primarily by physical geometry and material. For use of waveguide 60 in its active mode, the optoelectronics device described herein also includes at least one electrode positioned to apply an electric field to second waveguide 60. As illustrated in FIG. 1a, one electrode, shown as reference number 190, or more than one co-planar electrode (not shown) may be placed over waveguide 60. Alternatively, although not shown, electrodes can be placed on either side of waveguide 60 for applying an electric field thereto. In general, the applied electric field, material electro-optic axis, and polarization of the propagating optical signal should be aligned.

Optoelectronics devices of the present invention which incorporate the compound waveguide structure described above include optical filters where collection of the energy in the overlay is desired, modulators, attenuators, and amplifiers where eliminating the loss mechanism is advantageous. Optical modulators, filters, amplifiers, and attenuators which use conventional waveguide materials in a compound optical waveguide design are fully discussed in copending, commonly assigned U.S. patent applications Ser. Nos. 08/786,033, 08/785,871, and 08/786,047, all filed Jan. 21, 1997; U.S. application Ser. No. 08/928,578 filed Sep. 12, 1997; and U.S. application Ser. No. 09/026,555 filed Feb. 20, 1998, the disclosures of which are incorporated herein by reference.

Figure 3:
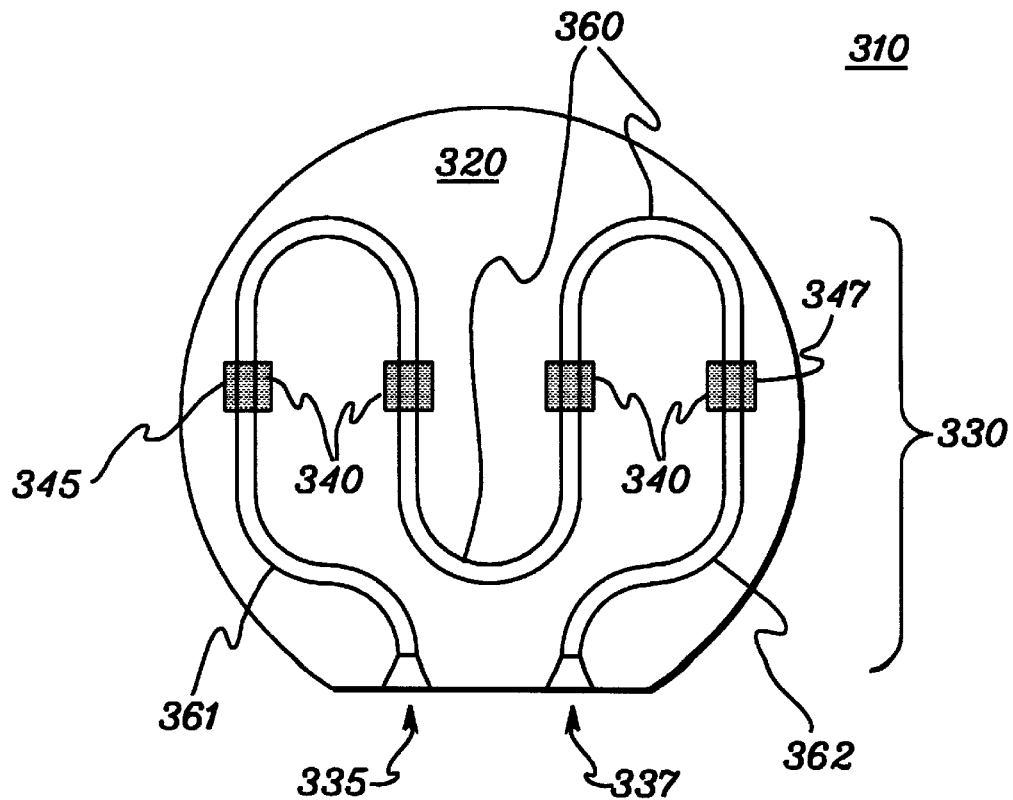
FIG. 3 is a top plan view of an optical structure wherein an optical circuit containing a polymeric optical waveguide is disposed atop a substrate.

In accordance with the present invention, another primary use of the positive photochromic materials and waveguides described herein is to create a system that can be patterned into optical structures, particularly integrated optical circuits. FIG. 3 shows a top plan view of optical structure 310 comprising substrate 320 and optical circuit 330 disposed atop substrate 320. Optical circuit 330 includes at least two optical devices 340 and a novel optical waveguide structure 360 described above. Each of the optical devices 340 is optically coupled to and physically separated by a portion of optical waveguide 360. The novel waveguide structure 360 can be formed on substrate 320 to connect optical devices 340 using the present method outlined above. The characteristics and compositions of waveguides 360 containing components (III) and (III') or (V') and (V') and suitable substrates 320 are as previously described. Preferably, optical circuit 330 is an integrated optical circuit, which means that it contains multiple, interconnected circuit elements 340 contained on or in common substrate 320 that function as a unit and not separately.

Optical structure 310 of the present invention may also include optical input 335 and optical output 337. Input 335 is optically connected to second portion 361 of optical waveguide 360. Thus, optical energy from input 335 enters optical circuit 330 through second portion 361 and then passes to optical device 345. This portion 361 of optical waveguide 360 optically connects and physically separates input 335 from optical device 345. Optical energy exits optical circuit 330 through optical output 337 which is optically connected to third portion 362 of optical waveguide 360. Third portion 362 of the waveguide optically connects and physically separates output 337 from optical device 347 contained in the circuit.

While the invention has been particularly shown and described with reference to preferred embodiment(s) thereof, it will be understood by those skilled in the art that various changes in form and details may be made therein without departing from the spirit and scope of the invention.

We claim:

1. An optical waveguide structure comprising
   (a) a light-transmitting core comprising an electro-optical polymeric material comprising
   (1) a first aliphatic or aromatic polymer selected from the group of polyimides, polyethers, polyetherimides, polyesters, polycarbonates, polyurethanes, polyamides, polysiloxanes, polyacrylates, and polystyrene; and
   (2) an electro-optical component selected from the group of electro-optical compounds or moieties having formula (V') or (III')

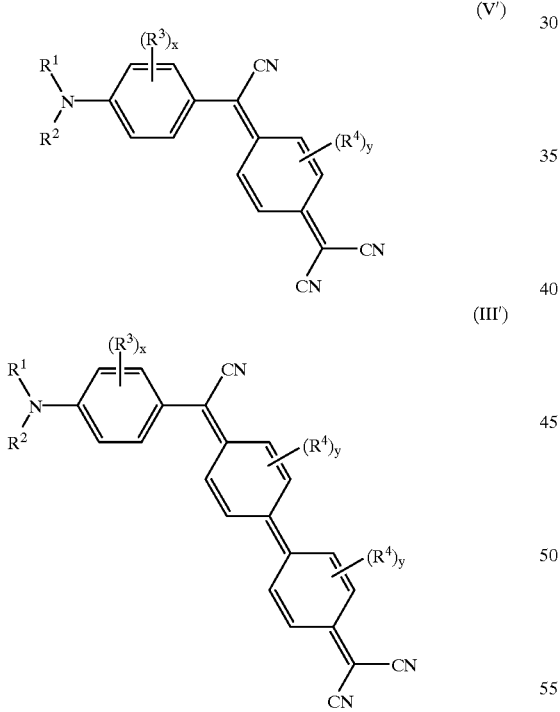

wherein when said selected electro-optical component is an electro-optical compound, then said electro-optical compound is in admixture with said first polymer, and $R^1$ is hydrogen, deuterium, alkyl, cycloalkyl, alkenyl, cycloalkenyl, aryl, alkylaryl, arylalkyl, or a deuterated equivalent thereof; and when said selected electro-optical component is an electro-optical moiety, then said electro-optical moiety is chemically bonded to the backbone of said first polymer through $R^1$ as an electro-optical pendent sidegroup, and $R^1$ is an alkylene or alkoxyalkylene radical having from 1 to 6 carbon atoms or a deuterated equivalent thereof;

$R^2$ is independently hydrogen, deuterium, alkyl, cycloalkyl, alkenyl, cycloalkenyl, aryl, alkylaryl, arylalkyl, or a deuterated equivalent thereof; each $R^3$ and $R^4$ is independently deuterium, alkyl, cycloalkyl, alkenyl, cycloalkenyl, aryl, alkylaryl, arylalkyl, alkoxyalkyl, aryloxyalkyl, haloalkyl, haloaryl, halogen, or a deuterated equivalent thereof; and x and y are each independently 0 or an integer from 1 to 4; and (b) a cladding material partially or entirely enclosing said core, said cladding material comprising a photochromic polymeric material exhibiting a lower refractive index relative to said electro-optical polymeric material, wherein said photochromic polymeric material comprises a second aliphatic or aromatic polymer identical in structure with said first polymer and a photoactive component comprising a photoactive compound or moiety having formula (V) or (III)

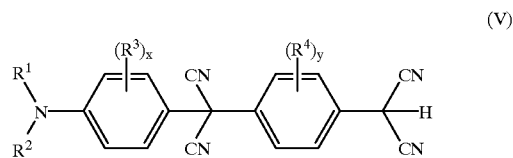

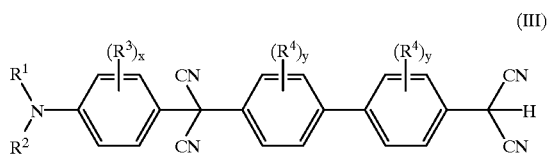

wherein said photoactive component has formula (V) when said electro-optical component has formula (V'), and said photoactive component has formula (III) when said electro-optical component has formula (III');

wherein when said photoactive component is a photoactive compound, then said photoactive compound is in admixture with said second polymer; and when said photoactive component is a photoactive moiety, then said photoactive moiety is chemically bonded to the backbone of said second polymer through $R^1$ as a photoactive pendent sidegroup.

2. The waveguide structure of claim 1, wherein said electro-optical component of said core is an electro-optical moiety chemically bonded to the backbone of said first polymer through $R^1$ and is an electro-optical pendent sidegroup, wherein said electro-optical polymeric material comprises structural units of formulas (VI') and (VIA')

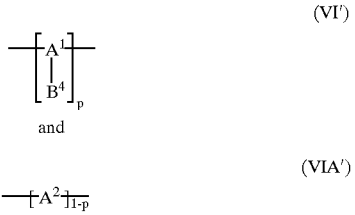

and wherein said photoactive component of said cladding is a photoactive moiety chemically bonded to the backbone of said second polymer through $R^1$ and is a photoactive pendent sidegroup, wherein said photochromic polymeric material comprises structural units of formulas (VI) and (VIA)

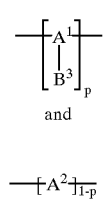

(VI)

and (VIA)

wherein $A^1$ and $A^2$ are each structural monomers that upon polymerization form said first polymer or said second polymer, respectively;

wherein p is the mole fraction of structural units (VI') and (VI) in said electro-optical polymeric material and said photochromic polymeric material, respectively, having a numeric value from about 0.01 to 1, and 1−p is the mole fraction of structural units (VIA);

wherein $B^4$ is said electro-optical pendent sidegroup of formula (V') or (III'); and $B^3$ is said photoactive pendent sidegroup of formula (V) or (III).

3. The waveguide structure of claim 2, wherein $R^1$ is an ethylene radical, $R^2$ is a methyl group, and x is 0 in formulas (V'), (III'), (V), and (III); y is 0 in formulas (III') and (III); and y is 0, 2, or 4 in formulas (V') and (V); wherein when y is 2, the $R^4$s are methyl groups in a 2,5 or 3,6 relationship, and wherein when y is 4, each $R^4$ is fluorine.

4. The waveguide structure of claim 3, wherein $B^4$ has formula (V'), $B^3$ has formula (V), and y is 0.

5. The waveguide structure of claim 3, wherein said first and second polymers are polymethacrylates, wherein formula (VI') in said electro-optical polymeric material of said core is represented as

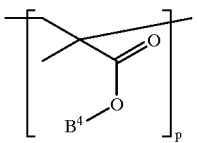

formula (VI) in said photochromic polymeric material of said cladding is represented as

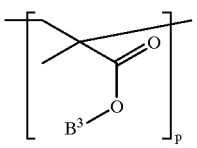

and formula (VIA) is represented as

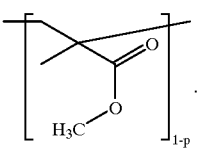

6. The waveguide structure of claim 3, wherein said first and second polymers are polyimides, wherein formula (VI')

in said electro-optical polymeric material of said core is represented as

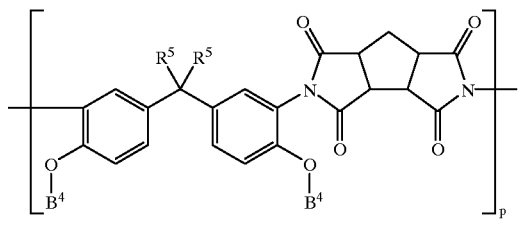

formula (VI) in said photochromic polymeric material of said cladding is represented as

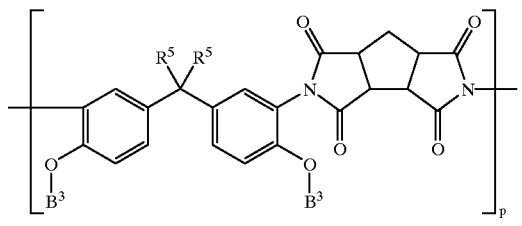

and formula (VIA) is represented as

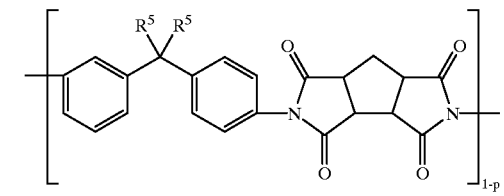

wherein $R^5$ is methyl, trifluoromethyl, or a deuterated equivalent thereof.

7. An optoelectronics device comprising
(a) a substrate holding at least a portion of a first, elongate waveguide propagating an optical signal along a propagation axis thereof; and
(b) a second waveguide positioned in optical proximity to said portion of said first waveguide, said second waveguide having a propagation axis aligned with said propagation axis of said portion of said first waveguide, said second waveguide coupling optical energy to or from said optical signal propagating in said first waveguide, wherein said second waveguide comprises said optical waveguide structure of claim 1.

8. The optoelectronics device of claim 7 further comprising:
(c) at least one electrode positioned to apply an electric field to said second waveguide.

9. The optoelectronics device of claim 7, wherein said second waveguide is a channel waveguide.

10. The optoelectronics device of claim 7, wherein said first elongate waveguide comprises a fiber waveguide, and wherein said portion of said first waveguide comprises a side-polished portion of said fiber waveguide, and optical energy is evanescently coupled to or from said side-polished portion of said fiber waveguide.

11. An optical structure comprising
(a) a substrate; and
(b) an optical circuit disposed atop said substrate, wherein said optical circuit comprises at least two optical devices and an optical waveguide, wherein each of said optical devices is optically coupled to and physically separated by a portion of said optical waveguide, and wherein said optical waveguide comprises said optical waveguide structure of claim 1.

12. The optical structure of claim 11, wherein said optical circuit is an integrated optical circuit.

13. The optical structure of claim 11 further comprising (c) an optical input optically connected to a second portion of said optical waveguide through which optical energy from said input enters said optical circuit and passes to one of said optical devices, said second portion of said optical waveguide optically connecting and physically separating said input from said one of said optical devices; and (d) an optical output optically connected to a third portion of said optical waveguide from which optical energy exits said optical circuit, said third portion of said optical waveguide optically connecting and physically separating said output from another of said optical devices.

14. The waveguide structure of claim 1, wherein said electro-optical polymeric material of said core comprises from about 0.1 to 20% by weight of said electro-optical component, and from about 80.0 to 99.9% by weight of said first polymer, and wherein said photochromic polymeric material of said cladding material comprises from about 0.1 to 20% by weight of said photoactive component, and from about 80.0 to 99.9% by weight of said second polymer.

15. The waveguide structure of claim 1, wherein x and y are both 0.

16. The waveguide structure of claim 1, wherein in formulas (V') and (V), x is 0, y is 4, and each $R^4$ is fluorine.

17. The waveguide structure of claim 1, wherein in formulas (V') and (V), x is 0, y is 2, and the $R^4$s are methyl groups in a 2,5 or 3,6 relationship.

18. A method for forming an optical waveguide having electro-optical properties which comprises:

(a) forming on a substrate a layer of a photochromic polymeric material dissolved in an organic solvent, wherein said photochromic polymeric material comprises an aliphatic or aromatic polymer selected from the group of polyimides, polyethers, polyetherimides, polyesters, polycarbonates, polyurethanes, polyamides polysiloxanes, polyacrylates, and polystyrene; and a photoactive component selected from the group of photoactive compounds and photoactive moieties having formula (V) or (III)

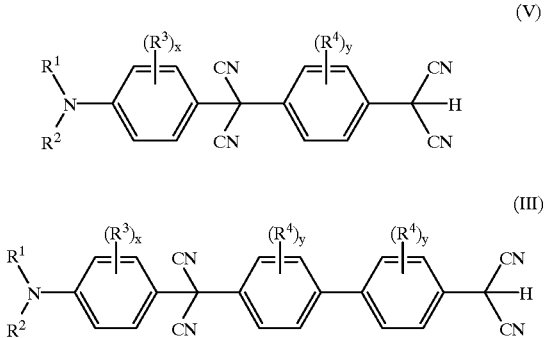

wherein when said photoactive component is a photoactive compound, then said photoactive compound is in admixture with said polymer, and $R^1$ is hydrogen, deuterium, alkyl, cycloalkyl, alkenyl, cycloalkenyl, aryl, alkylaryl, arylalkyl, or a deuterated equivalent thereof; and when said photoactive component is a photoactive moiety, then said photoactive moiety is chemically bonded through $R^1$ as a pendent sidegroup to the backbone of said polymer, and $R^1$ is an alkylene or alkoxyalkylene radical having from 1 to 6 carbon atoms or a deuterated equivalent thereof;

wherein $R^2$ is hydrogen, deuterium, alkyl, cycloalkyl, alkenyl, cycloalkenyl, aryl, alkylaryl, arylalkyl, or a deuterated equivalent thereof; each $R^3$ and $R^4$ is independently deuterium, alkyl, cycloalkyl, alkenyl, cycloalkenyl, aryl, alkylaryl, arylalkyl, alkoxyalkyl, aryloxyalkyl, haloalkyl, haloaryl, halogen, or a deuterated equivalent thereof, and x and y are each independently 0 or an integer from 1 to 4; and (b) subjecting one or more predetermined regions of said layer to actinic radiation at a wavelength and in an amount of intensity sufficient to produce a chemical change in said photoactive compound or pendenit sidegroup, thereby producing an electro-optical polymeric material in said predetermined regions, said electro-optical polymeric material having a higher refractive index relative to said photochromic polymeric material and serving as the core of said optical waveguide.

19. The method of claim 18, wherein said organic solvent comprises a polar aprotic solvent selected from the group of N-methyl-2-pyrrolidinone, N,N-dimethylformamide, N,N-dimethylacetamide, and dimethyl sulfoxide.

20. The method of claim 19, wherein said organic solvent further comprises a second solvent selected from the group of tetrachloroethane, methylene chloride, chloroform, chlorobenzene, chlorotoluene, tetrahydrofuran, and anisole, wherein said second solvent is mixed in solution with said polar aprotic solvent.

21. The method of claim 18 further comprising after step (b) the step of heating said layer at a temperature and for a timing sufficient to remove said organic solvent.

22. The method of claim 21, wherein said heating step is conducted in the presence of an applied electrical field so as to pole the electro-optical components of said electro-optical polymeric material, said heating step being followed by a cooling step.

23. The method of claim 18, wherein said photoactive component is a photoactive moiety of formula (V) or (III), wherein $R^1$ is an ethylene radical, $R^2$ is a methyl group, x is 0, y is 0 in formula (III), and y is 0, 2, or 4 in formula (V); wherein when y is 2, the $R^4$s are methyl groups in a 2,5 or 3,6 relationship, and wherein when y is 4, each $R^4$ is fluorine.

24. The method of claim 18, wherein said electro-optical polymeric material produced comprises said aliphatic or aromatic polymer and an electro-optical component, wherein said electro-optical component is produced upon irradiation of said selected photoactive compound or photoactive moiety having formula (V) or (III), wherein said electro-optical component has corresponding respective formula (V') or (III')

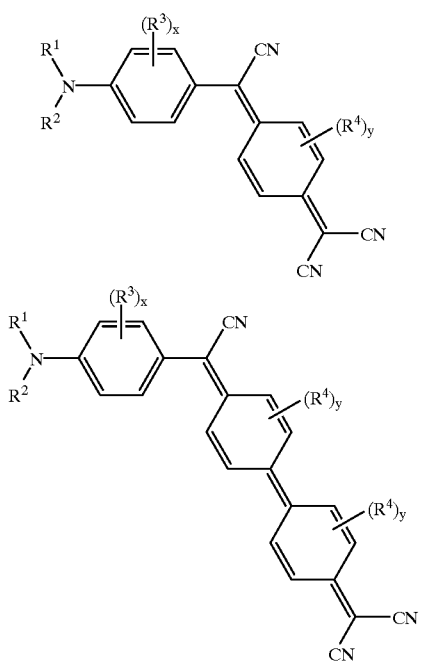

(V')

(III')

25. The method of claim 18, wherein said actinic radiation is in the form of UV light having a wavelength from about 250 to about 350 nm.

26. The method of claim 18, further comprising between steps (a) and (b) the step of placing a mask having a desired waveguide pattern between the source of said actinic radiation and said photochromic polymeric material layer, wherein said mask has opaque and transparent regions, whereby said actinic radiation passes only through said transparent regions and irradiates only said one or more predetermined regions of said photochromic polymeric material layer.

27. The method of claim 18, wherein said actinic radiation is provided by a directed beam or focused beam which contacts only said one or more predetermined regions of said photochromic polymeric material layer.

28. The method of claim 18, wherein x and y are both 0.

29. The method of claim 18, wherein in formula (V), x is 0, y is 4, and each $R^4$ is fluorine.

30. The method of claim 18, wherein in formula (V), x is 0, y is 2, and the $R^4$s are methyl groups in a 2,5 or 3,6 relationship.

* * * * *